(12) United States Patent
Fowe et al.

(10) Patent No.: US 12,017,680 B2
(45) Date of Patent: Jun. 25, 2024

(54) METHOD, APPARATUS, AND COMPUTER PROGRAM PRODUCT FOR REAL-TIME MAP-MATCHING

(71) Applicant: HERE GLOBAL B.V., Eindhoven (NL)

(72) Inventors: James Adeyemi Fowe, Chicago, IL (US); Bruce Bernhardt, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/646,029

(22) Filed: Dec. 27, 2021

(65) Prior Publication Data

US 2023/0202509 A1    Jun. 29, 2023

(51) Int. Cl.
*B60W 60/00*    (2020.01)
*G01C 21/00*    (2006.01)

(52) U.S. Cl.
CPC ....... *B60W 60/001* (2020.02); *G01C 21/3815* (2020.08)

(58) Field of Classification Search
CPC .......... B60W 60/001; G06Q 30/0259; H04W 4/023; G01C 21/3676; G01C 21/10; G01C 21/3885; G01C 21/30; G01S 5/0269; G01F 18/23
See application file for complete search history.

(56) References Cited

U.S. PATENT DOCUMENTS

| | | | |
|---|---|---|---|
| 9,909,896 B2* | 3/2018 | Bass | G06Q 30/0259 |
| 2014/0358414 A1* | 12/2014 | Ibrahim | G01C 21/10 |
| | | | 701/119 |
| 2020/0145790 A1* | 5/2020 | Yang | G01S 5/0269 |
| 2020/0166372 A1* | 5/2020 | Watanabe | G01C 21/3676 |
| 2021/0095971 A1 | 4/2021 | Mao et al. | |
| 2022/0042820 A1* | 2/2022 | Liang | H04W 4/023 |

FOREIGN PATENT DOCUMENTS

| | | | | |
|---|---|---|---|---|
| CN | 102735247 A | * | 10/2012 | ............. G01C 21/30 |
| CN | 113052206 A | * | 6/2021 | ............. G06F 18/23 |
| JP | 11304512 A | | 11/1999 | |
| JP | 4797901 B2 | | 10/2011 | |
| KR | 20110043294 A | | 4/2011 | |
| KR | 102063017 B1 | | 1/2020 | |

* cited by examiner

*Primary Examiner* — Yuri Kan
(74) *Attorney, Agent, or Firm* — ALSTON & BIRD LLP (57) ABSTRACT

A method, apparatus, and computer program product are provided for real-time map-matching of probe data. Methods may include: receiving a plurality of probe data points; receiving an indication of changes to the road network, where the indication of changes includes an addition of new road segments and a removal of closed road segments; map-matching the plurality of probe data points to one or more road segments of the road network based on closest candidate road segments to form map-matched probe data; in response to a closest candidate road segment for one or more probe data points of the plurality of probe data points corresponding to a closed road segment, map-matching the one or more probe data points to a next closest candidate road segment in the map-matched probe data; and updating dynamic map data with the map-matched probe data.

20 Claims, 6 Drawing Sheets

METHOD, APPARATUS, AND COMPUTER PROGRAM PRODUCT FOR REAL-TIME MAP-MATCHING

TECHNOLOGICAL FIELD

An example embodiment of the present invention relates to map-matching location data to a map, and more particularly, to map-matching probe data to a dynamic map with real-time or near real-time updates enabling map changes to be updated in real-time.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as vehicle speed profile information based on historical speed profiles of vehicles traveling among a road network.

Vehicle and traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy or slow traffic routes between an origin and a destination. However, in order to use crowd-sourced data from mobile devices or probe data, whether for map and traffic updates or to facilitate route navigation, the mobile device or probe data must be accurately map matched to map elements of the map to ensure the appropriate probe data is used with a corresponding map element, such as a road segment. Map matching is not a trivial task and requires substantial processing capacity given the vast amount of probe data available. As such, improvements to map matching processes are desirable.

BRIEF SUMMARY

A method, apparatus, and computer program product are provided in accordance with an example embodiment for map-matching location data to a map, and more particularly, to map-matching probe data to a dynamic map with real-time or near real-time updates enabling map changes to be updated in real-time. Embodiments provided herein include an apparatus including processing circuitry and at least one memory including computer program code, the at least one memory and computer program code configured to, with the processing circuitry, cause the apparatus to at least: receive a plurality of probe data points, where the plurality of probe data points are received from probe apparatuses traveling within a road network; receive an indication of changes to the road network, where the indication of changes includes an addition of new road segments and a removal of closed road segments; map-match the plurality of probe data points to one or more road segments of the road network based on closest candidate road segments to form map-matched probe data; in response to a closest candidate road segment for one or more probe data points of the plurality of probe data points corresponding to a closed road segment, map-match the one or more probe data points to a next closest candidate road segment in the map-matched probe data; update dynamic map data with the map-matched probe data, where the dynamic map data is used for at least one of route guidance or at least semi-autonomous control of vehicles traveling within the road network.

According to some embodiments, causing the apparatus to map-match the plurality of probe data points to one or more road segments of the road network includes causing the apparatus to map-match each of the plurality of probe data points to a candidate road segment using a Hidden Markov Model. The closest candidate road segment for the one or more probe data points of the plurality of probe data points is determined, in some embodiments, based on a distance of the one or more probe data points to the closest candidate road segment. The closest candidate road segment for the one or more probe data points of the plurality of probe data points is determine, in some embodiments, based on a distance of the one or more probe data points to the closest candidate road segment and a heading of the one or more probe data points relative to a heading of the closest candidate road segment.

According to some embodiments, map data of the road network is stored in a map database, where the indication of changes to the road network including the addition of new road segments and the removal of closed road segments includes an update to the map data of the road network. The update to the map data of the road network includes, in some embodiments, link identifiers of closed road segments and tentative link identifiers for new road segments. According to some embodiments, causing the apparatus to map-match the plurality of probe data points to one or more road segments of the road network based on the closest candidate road segments to form map-matched probe data includes causing the apparatus to map-match one or more probe data points to a tentative link identifier of a new road segment.

Embodiments provided herein include a computer program product including at least one non-transitory computer-readable storage medium having computer-executable program code portions stored therein, the computer-executable program code portions including program code instructions configured to: receive a plurality of probe data points, where the plurality of probe data points are received from probe apparatuses traveling within a road network; receive an indication of changes to the road network, where the indication of changes includes an addition of new road segments and a removal of closed road segments; map-match the plurality of probe data points to one or more road segments of the road network based on closest candidate road segments to form map-matched probe data; in response to a closest candidate road segment for one or more probe data points of the plurality of probe data points corresponding to a closed road segment, map-match the one or more probe data points to a next closest candidate road segment in the map-matched probe data; update dynamic map data with the map-matched probe data, where the dynamic map data is used for at least one of route guidance or at least semi-autonomous control of vehicles traveling within the road network.

According to some embodiments, the program code instructions to map-match the plurality of probe data points to one or more road segments of the road network include program code instructions to map-match each of the plurality of probe data points to a candidate road segment using a Hidden Markov Model. The closest candidate road segment for the one or more probe data points of the plurality of probe data points is determined, in some embodiments, based on a distance of the one or more probe data points to the closest candidate road segment. The closest candidate road segment for the one or more probe data points of the plurality of probe data points is determined, in some embodiments, based on a distance of the one or more probe data points to the closest candidate road segment and a heading of the one or more probe data points relative to a heading of the closest candidate road segment.

According to some embodiments, map data of the road network is stored in a map database, where the indication of changes to the road network including the addition of new road segments and the removal of closed road segments includes an update to the map data of the road network. The update to the map data of the road network includes, in some embodiments, link identifiers of closed road segments and tentative link identifiers for new road segments. According to some embodiments, the program code instructions to map-match the plurality of probe data points to one or more road segments of the road network based on the closest candidate road segments to form map-matched probe data include program code instructions to map-match one or more probe data points to a tentative link identifier of a new road segment.

Embodiments provided herein include a method including: receiving a plurality of probe data points, where the plurality of probe data points are received from probe apparatuses traveling within a road network; receiving an indication of changes to the road network, where the indication of changes includes an addition of new road segments and a removal of closed road segments; map-matching the plurality of probe data points to one or more road segments of the road network based on closest candidate road segments to form map-matched probe data; in response to a closest candidate road segment for one or more probe data points of the plurality of probe data points corresponding to a closed road segment, map-matching the one or more probe data points to a next closest candidate road segment in the map-matched probe data; and updating dynamic map data with the map-matched probe data, where the dynamic map data is used for at least one of route guidance or at least semi-autonomous control of vehicles traveling within the road network.

According to some embodiments, map-matching the plurality of probe data points to one or more road segments of the road network includes map-matching each of the plurality of probe data points to a candidate road segment using a Hidden Markov Model. The closest candidate road segment for the one or more probe data points of the plurality of probe data points is determined, in some embodiments, based on a distance of the one or more probe data points to the closest candidate road segment. The closest candidate road segment for the one or more probe data points of the plurality of probe data points is determined, in some embodiments, based on a distance of the one or more probe data points to the closest candidate road segment and a heading of the one or more probe data points relative to a heading of the closest candidate road segment.

According to some embodiments, map data of the road network is stored in a map database, where the indication of changes to the road network including the addition of new road segments and the removal of closed road segments includes an update to the map data of the road network. The update to the map data of the road network includes, in some embodiments, link identifiers of closed road segments and tentative link identifiers for new road segments. According to some embodiments, map-matching the plurality of probe data points to one or more road segments of the road network based on the closest candidate road segments to form map-matched probe data includes map-matching one or more probe data points to a tentative link identifier of a new road segment.

Embodiments provided herein include an apparatus including: means for receiving a plurality of probe data points, where the plurality of probe data points are received from probe apparatuses traveling within a road network; means for receiving an indication of changes to the road network, where the indication of changes includes an addition of new road segments and a removal of closed road segments; means for map-matching the plurality of probe data points to one or more road segments of the road network based on closest candidate road segments to form map-matched probe data; in response to a closest candidate road segment for one or more probe data points of the plurality of probe data points corresponding to a closed road segment, means for map-matching the one or more probe data points to a next closest candidate road segment in the map-matched probe data; and means for updating dynamic map data with the map-matched probe data, where the dynamic map data is used for at least one of route guidance or at least semi-autonomous control of vehicles traveling within the road network.

According to some embodiments, the means for map-matching the plurality of probe data points to one or more road segments of the road network includes means for map-matching each of the plurality of probe data points to a candidate road segment using a Hidden Markov Model. The closest candidate road segment for the one or more probe data points of the plurality of probe data points is determined, in some embodiments, based on a distance of the one or more probe data points to the closest candidate road segment. The closest candidate road segment for the one or more probe data points of the plurality of probe data points is determined, in some embodiments, based on a distance of the one or more probe data points to the closest candidate road segment and a heading of the one or more probe data points relative to a heading of the closest candidate road segment.

According to some embodiments, map data of the road network is stored in a map database, where the indication of changes to the road network including the addition of new road segments and the removal of closed road segments includes an update to the map data of the road network. The update to the map data of the road network includes, in some embodiments, link identifiers of closed road segments and tentative link identifiers for new road segments. According to some embodiments, the means for map-matching the plurality of probe data points to one or more road segments of the road network based on the closest candidate road segments to form map-matched probe data includes means for map-matching one or more probe data points to a tentative link identifier of a new road segment.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for map-matching location data to a map, and more particularly, to map-matching probe data to a dynamic map with real-time or near real-time updates enabling map changes to be updated in real-time. Most map-matching techniques involve algorithms and software architecture that use static maps as an artifact or database generated offline. Embodiments described herein provide map-matching with real-time updates using a system architecture that allows map changes to be updated in real-time while the map-matcher is running.

Real-time and near real-time are described herein as occurring with low latency, where map-matching occurs within a finite and relatively short period of time, such as milliseconds, seconds, or in some cases, minutes. However, real-time and near real-time will hereinafter be referred to as "real-time" which includes real-time, near-real time, and substantially real-time occurrences that happen with little delay, particularly compared to latency of conventional map matching.

The performance of map service providers is impacted by closed or modified roads for which updates have not yet been provided in a digital map. Probe data points can inadvertently be map-matched to roads that are closed, temporarily or permanently, leading to issues with route guidance, navigation, and autonomous vehicle control. When a map-matcher that uses probability metrics to select links to match a probe data point to is not aware of a road that has been closed, probe data points can be matched to the closed road leading to low quality traffic products (e.g., false traffic information, erroneous road-closure/open detection, wrong routing, and path selection).

Embodiments described herein provide map-matching with real-time updates using a system architecture that enables map changes to be updated in real-time while the map-matcher is running. This enables an automated or manually supervised process to change the map artifact in real-time to accommodate changes to the road network. Embodiments are of particular benefit for anomalies in traffic behavior, such as during natural disasters or major events that require a temporary change in traffic flow. These events may be unplanned and therefore do not allow road planning authorities any time to notify map creators of the changes. Route guidance, navigation, and autonomous vehicle control employ maps and benefit from real-time map matching as described herein.

Figure 1:
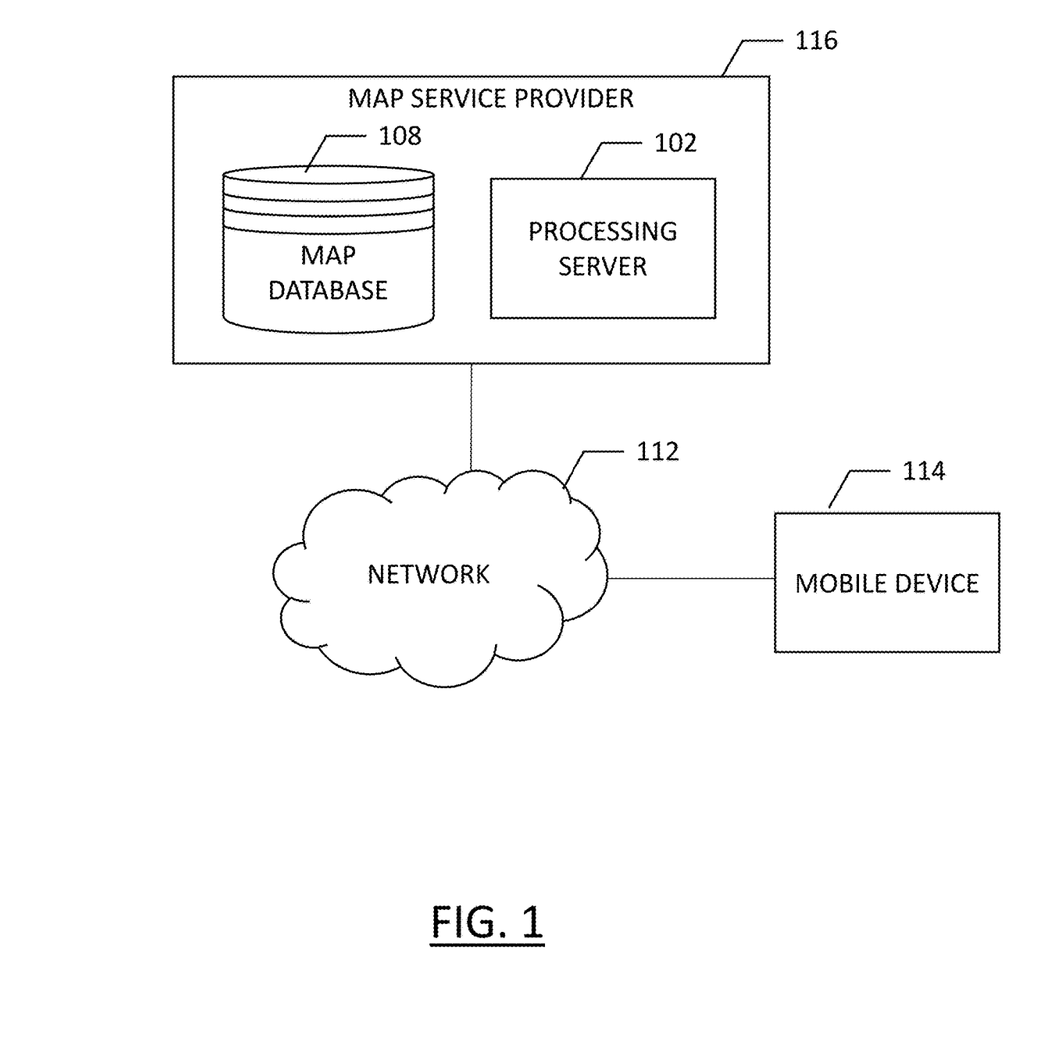
FIG. 1 illustrates a communications diagram for real-time map-matching in accordance with an example embodiment.

FIG. 1 illustrates a communication diagram of an example embodiment of a system for implementing example embodiments of the present disclosure. The illustrated embodiment of FIG. 1 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and networks of a system operator. The processing server 102 may include the map database 108, such as a remote map server. The network may be wired, wireless, or any combination of wired and wireless communication networks, such as cellular, Wi-Fi, internet, local area networks, or the like.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Further, crowd-sourced data from vehicles traveling along the road links in the road network may provide information relating to their respective speed of travel, which may inform the map services provider with respect to vehicle speeds, such as lane level vehicle speed profiles.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the end user device to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

Figure 2:
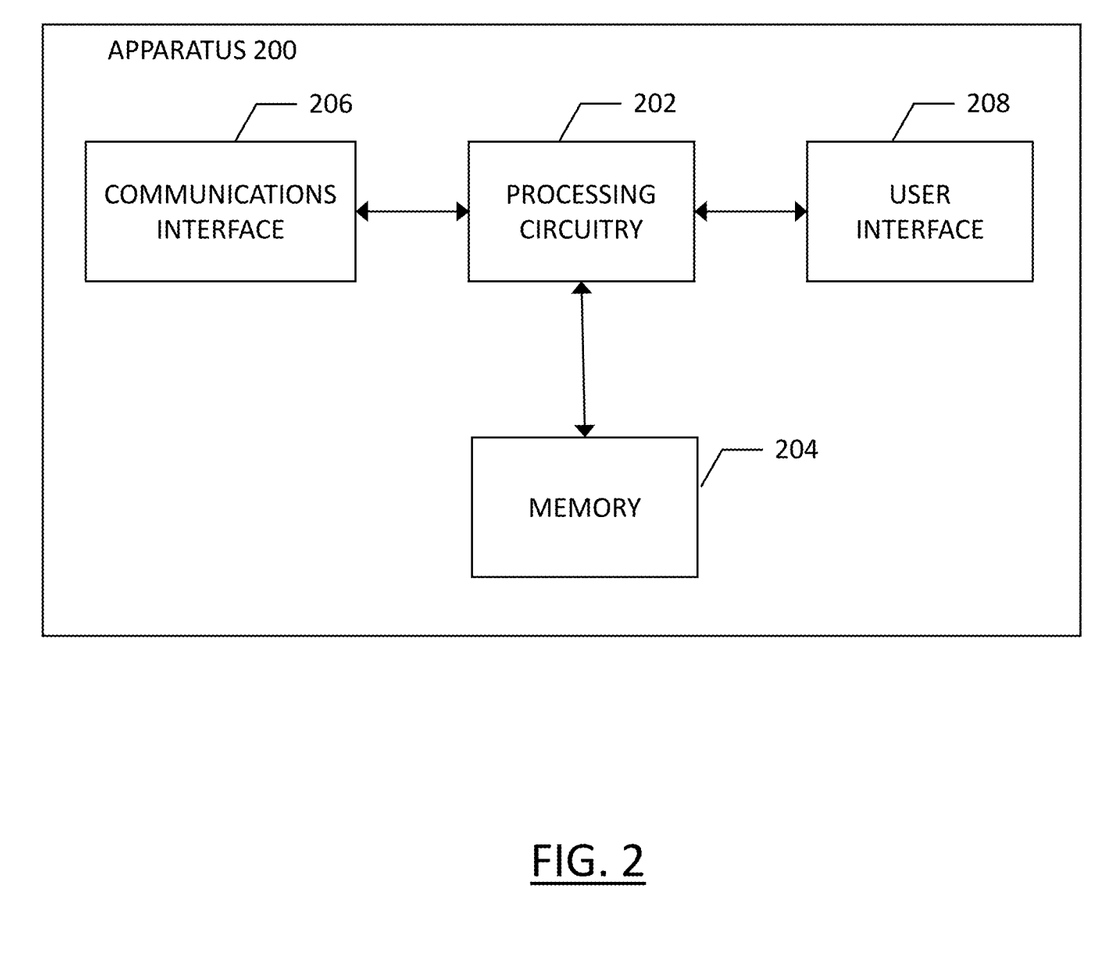
FIG. 2 is a block diagram of an apparatus that may be specifically configured for real-time map-matching of probe data points in accordance with an example embodiment described herein.

An example embodiment of a processing server 102 may be embodied in an apparatus as illustrated in FIG. 2. The apparatus, such as that shown in FIG. 2, may be specifically configured in accordance with an example embodiment of the present disclosure for detecting changes in road conditions in real-time through real-time map matching. The apparatus may include or otherwise be in communication with a processing circuitry 202, a memory device 204, a communication interface 206, and a user interface 208. In some embodiments, the processing circuitry (and/or coprocessors or any other processing circuitry assisting or otherwise associated with the processing circuitry) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present invention. For example, the memory device could be configured to buffer input data for processing by the processing circuitry. Additionally or alternatively, the memory device could be configured to store instructions for execution by the processing circuitry.

The processing circuitry 202 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor specific device (for example, a mobile terminal or a fixed computing device) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry comprising the processor may be configured to control one or more functions of one or more user interface elements through computer program instructions (for example, software and/or firmware) stored on a memory accessible to the processing circuitry (for example, memory device 204, and/or the like.

Embodiments described herein map-match location data to a dynamic map in real-time to enable map changes and dynamic map data to be maintained in real-time. The process of example embodiments employs a modified map-matching algorithm to enable real-time updates of removed, modified, or new roads. Example embodiments described herein depict a modified road as modeled through removal of a road and adding a new road. Two lists are generated by embodiments described herein that can be updated using an interface, such as a web interface, to include removed roads (RR) and new roads (NR). The process of real-time map-matching relies on certain fundamental principles. Probe data points on known surrounding roads should not be matched to removed roads. Probe data points on new roads should not be map-matched to removed roads. Probe data points incorrectly map-matched to removed roads should be map-matched to appropriate roads. Probe data points on new roads can be map-matched to tentative link identifiers (LinkIDs) created for new roads. Using these basic principles, embodiments reliably and efficiently map-match probe data in real-time while avoiding map matching probe data to closed or removed road segments.

Figure 3:
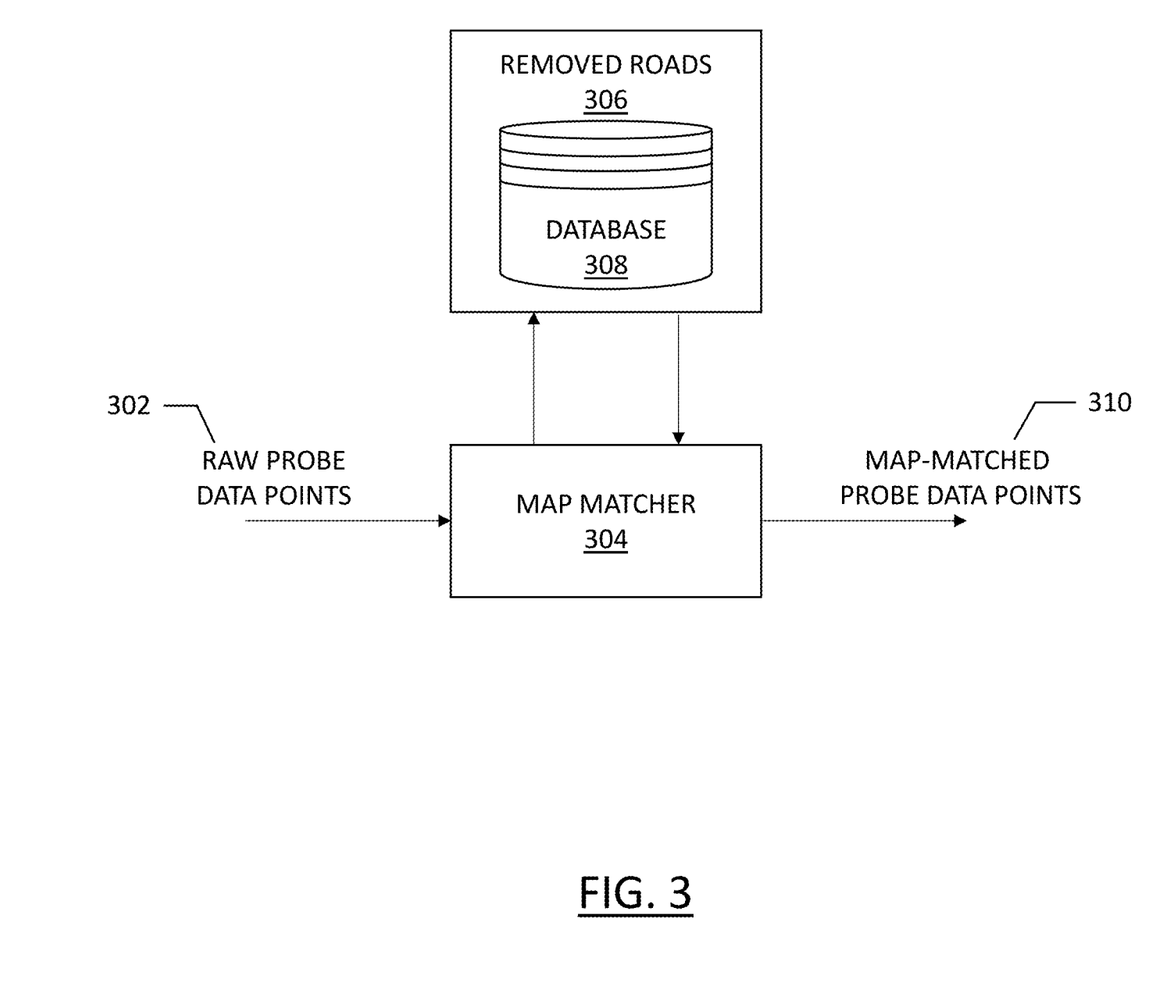
FIG. 3 illustrates an example embodiment of architecture for implementing map-matching of probe data for real-time updates according to example embodiments of the present disclosure.

FIG. 3 illustrates an example embodiment of architecture for implementing map-matching of probe data for real-time updates. As shown, raw probe data points 302 are received at the map-matcher 304. The map-matcher 304 can include or otherwise be in communication with (e.g., via a network) a listing of removed roads 306. The listing of removed roads 306 can be a file or distributed in-memory hash-map or database (e.g., database 308) which contains removed road links. The map-matcher 304, with an understanding of the removed road links, does not map-match raw probe data points 302 to removed roads. Avoiding such map-matching enables map-matched probe data points 310 to be output from the map-matcher efficiently and accurately.

Figure 4:
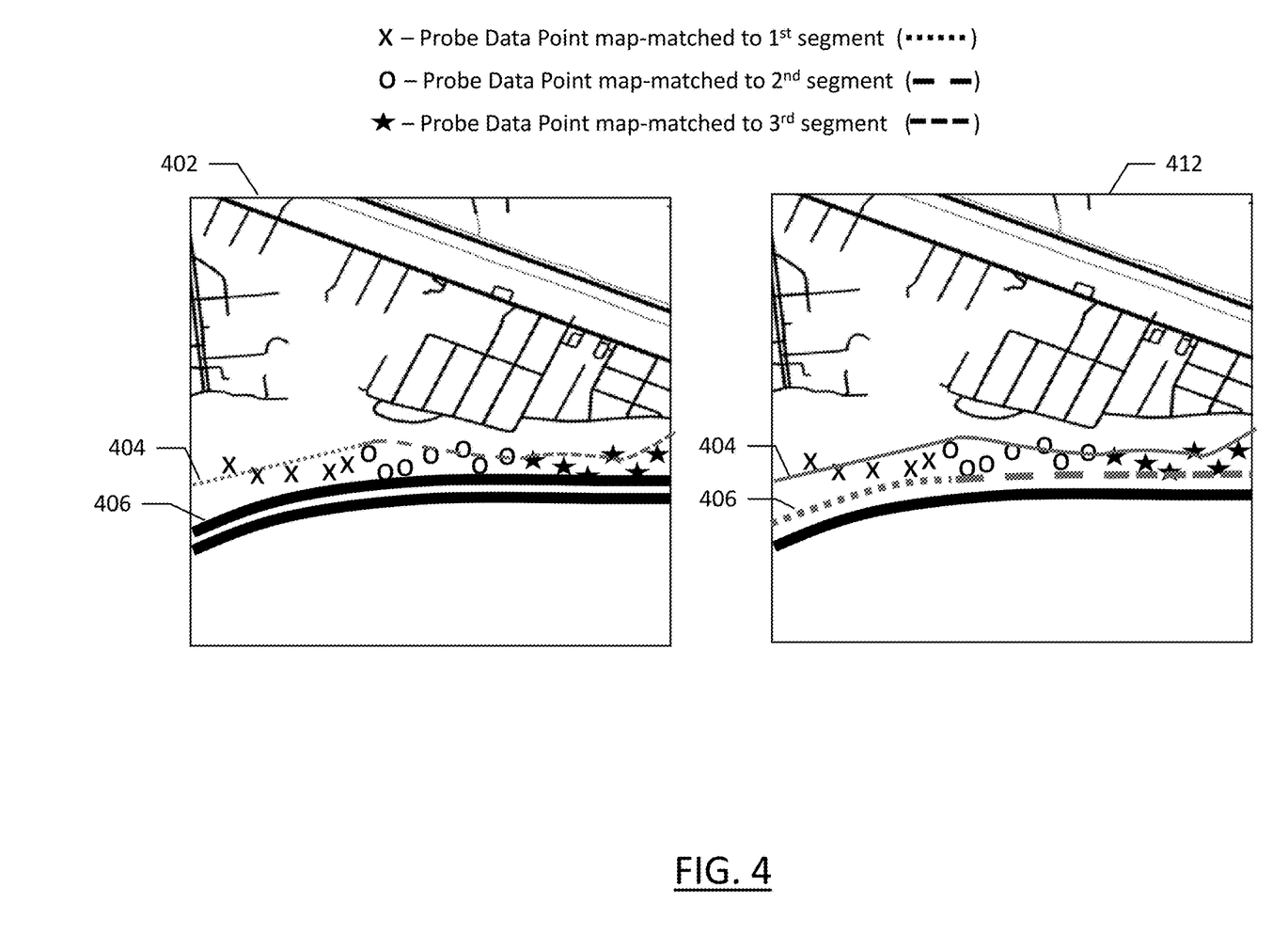
FIG. 4 illustrates an example embodiment of a conventional map-matcher compared to a map-matcher of example embodiment of the present disclosure.

FIG. 4 illustrates an example embodiment of a conventional map-matcher 402 compared to a map-matcher 412 of example embodiments provided herein. Probe data points have some degree of error associated with them based on the type of location means used to establish position. For example, GPS may be accurate to within three meters conventionally. However, as vehicles or mobile devices associated with vehicles are typically in motion, the GPS location may be of lower accuracy. Further, obstructions such as a tree canopy, urban canyons (buildings), bridges, tunnels, etc. adversely affect accuracy and reliability of probe data location. The probe data points of the conventional map-matcher 402 are found between a highway 406 and a service road 404; however, the service road is a closed road. The conventional map-matcher 402 may match the probe data points to the service road 404 that is closed as it appears in map data as an available road link. The map-matcher 412 of example embodiments receives the raw probe data points to the map-matcher, and based on the removed roads database, recognizes that service road 404 is a closed or removed road. Thus, the removed road (service road 404) is removed as a candidate for map matching of the probe data points and the probe data points are appropriately map-matched to the highway 406 as shown.

According to example embodiments provided herein, removed roads cease to be candidates for map-matching when the map-matcher is aware or has visibility to the closed road segments. In addition to avoiding map-matching probe data points to closed roads, embodiments of the disclosure increase the probe data for active roads through appropriately map-matching probe data points to active roads that would have otherwise been map-matched to closed roads.

Figure 5:
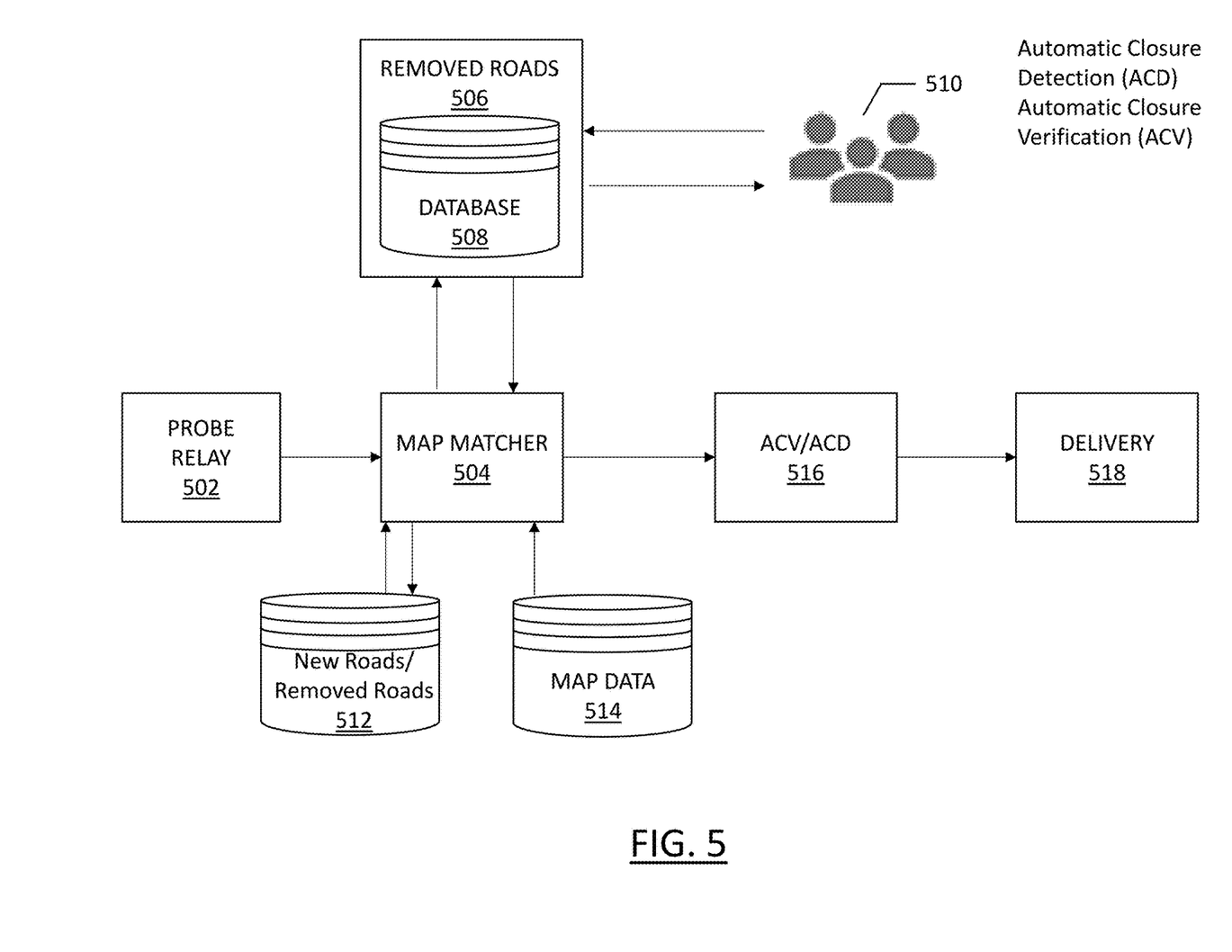
FIG. 5 illustrates a flow diagram of integration architecture for real-time map-matching according to an example embodiment of the present disclosure.

FIG. 5 illustrates an example embodiment of integration architecture. As shown, probe data points are received through probe relay 502 to the map-matcher 504. The map-matcher 504 receives indications of removed roads 506, such as from a database 508 of removed roads. The removed roads can be identified through crowd sourcing of information, such as through users 510 traveling along a road network. The removed road information can further come from municipalities (e.g., departments of transportation, emergency vehicles/first responders, etc.), road work crews, or other entities that are well-suited to identify road closures. The map-matcher 504 uses map data 514, such as map database 108 of map service provider 116, for map-matching, and can reference stored map data relating to new roads and removed roads 512 that can be established in the map data 514 or independently thereof through a more dynamic source since map data may have a periodic latency for updates.

The map-matcher 504 of the illustrated embodiment uses the probe data points and the data relating to the mapped road network (e.g., from map data 514) in addition to the further understanding of road closures and new roads obtained through removed road 506 and a database of new roads and removed roads 512 to ensure map-matching is performed to existing roads and new roads as they develop within a geographic region. The map-matched probe data is provided to a system for automatic closure detection (ACD) and automatic closure verification (ACV) at ACV/ACD 516. The ACV/ACD 516 automatically verifies a road closure using multiple possible vehicle paths between two probe points. The approach involves, for example, processing probe data to determine a possible path of a vehicle over a road graph, where the road graph represents a road segment and one or more other road segments entering or exiting the road segment. The ACV/ACD optionally includes calculating a path probability for the possible path, wherein the path probability indicates a likelihood that the possible path is a true path of the vehicle over the road graph. The map-matched probe data is then provided for delivery 518, where the map-matched probe data can be used for real-time traffic updates, real-time incident detection, real-time travel speeds along road segments, etc.

Embodiments provided herein refine map matching to improve overall performance of map-matching in real-time. The automated detection of road changes enable more timely updates without requiring data from road authorities. However, automated detection of road changes can verify or confirm data from road authorities as road closures and new road plans and schedules can change, and embodiments described herein provide a real-time confirmation of such road closures and new roads.

Figure 6:
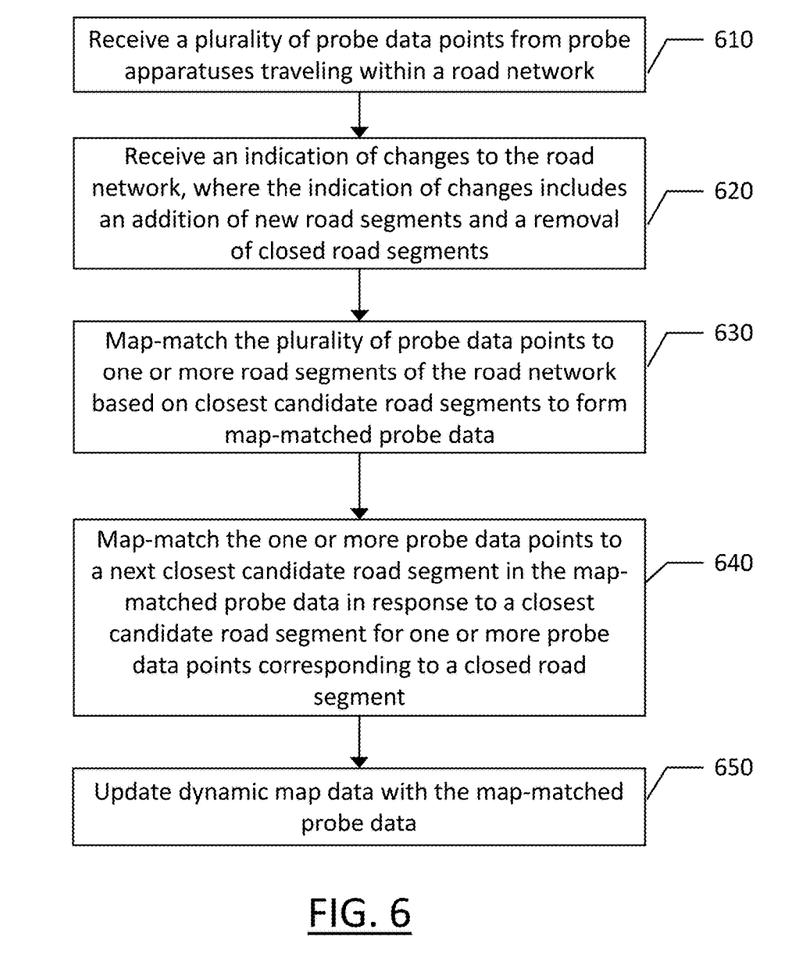
FIG. 6 illustrates a flowchart of a process for real-time map-matching according to an example embodiment of the present disclosure.

FIG. 6 illustrates a flowchart depicting a method according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 6 illustrates a flowchart of a method for real-time map-matching of probe data points that improves overall performance while automatically detecting rad changes to allow for more timely updates to dynamic map data. A plurality of probe data points are received at 610 from a plurality of probe apparatuses traveling within a road network. The probe apparatuses can include vehicles or mobile devices (e.g., mobile device 114) associated with or carried by a vehicle as it travels within a road network. An indication of changes to the road network are received at 620, where the indication of changes includes the addition of new road segments and the removal of closed road segments. These changes can be provided by vehicles traveling along the road network, municipalities, road work crews, emergency responders, etc. The plurality of probe data points are map-matched at 630 to one or more road segments of the road network based on closest candidate road segments to form map-matched probe data. One or more probe data points are map matched at 640 to a next closest candidate road segment in the map-matched probe data in response to a closest candidate road segment for one or more probe data points corresponding to a closed road segment. Dynamic map data is updated at 650 with the map-matched probe data. The dynamic map data can be used for route guidance and navigational assistance. The dynamic map data can further be used by autonomous or semi-autonomous vehicles to facilitate autonomous vehicle control within the road network.

In an example embodiment, an apparatus for performing the method of FIG. 6 above may comprise a processor (e.g., the processing circuitry 202) configured to perform some or each of the operations (610-650) described above. The processing circuitry may, for example, be configured to perform the operations (610-650) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-650 may comprise, for example, the processing circuitry 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising processing circuitry and at least one memory including computer program code, the at least one memory and computer program code configured to, with the processing circuitry, cause the apparatus to at least:
   receive a plurality of probe data points, the plurality of probe data points are received from probe apparatuses traveling within a road network;
   receive an indication of changes to the road network, wherein the indication of changes comprises an addition of new road segments and a removal of closed road segments;
   map-match the plurality of probe data points to one or more road segments of the road network based on closest candidate road segments to form map-matched probe data;
   in response to determining a closest candidate road segment for one or more probe data points of the plurality of probe data points corresponds to a closed road segment, map-match the one or more probe data points to a next closest candidate road segment determined in the map-matched probe data; and
   update map data with the map-matched probe data, wherein the map data is used for at least one of route guidance or at least semi-autonomous control of vehicles traveling within the road network.

2. The apparatus of claim 1, wherein causing the apparatus to map-match the plurality of probe data points to one or more road segments of the road network comprises causing the apparatus to map-match each of the plurality of probe data points to a candidate road segment using a Hidden Markov Model.

3. The apparatus of claim 1, wherein the closest candidate road segment for the one or more probe data points of the plurality of probe data points is determined based on a distance of the one or more probe data points to the closest candidate road segment.

4. The apparatus of claim 1, wherein the closest candidate road segment for the one or more probe data points of the plurality of probe data points is determined based on a distance of the one or more probe data points to the closest candidate road segment and a heading of the one or more probe data points relative to a heading of the closest candidate road segment.

5. The apparatus of claim 1, wherein the map data of the road network is stored in a map database, wherein the indication of changes to the road network comprising the addition of new road segments and the removal of closed road segments comprises an update to the map data of the road network.

6. The apparatus of claim 5, wherein the update to the map data of the road network comprises link identifiers of closed road segments and new link identifiers for new road segments.

7. The apparatus of claim 6, wherein causing the apparatus to map-match the plurality of probe data points to one or more road segments of the road network based on the closest candidate road segments to form map-matched probe data comprises causing the apparatus to map-match one or more probe data points to a new link identifier of a new road segment.

8. A computer program product comprising at least one non-transitory computer-readable storage medium having computer-executable program code portions stored therein, the computer-executable program code portions comprising program code instructions configured to:

receive a plurality of probe data points, the plurality of probe data points are received from probe apparatuses traveling within a road network;

receive an indication of changes to the road network, wherein the indication of changes comprises an addition of new road segments and a removal of closed road segments;

map-match the plurality of probe data points to one or more road segments of the road network based on closest candidate road segments to form map-matched probe data;

in response to determining a closest candidate road segment for one or more probe data points of the plurality of probe data points corresponds to a closed road segment, map-match the one or more probe data points to a next closest candidate road segment determined in the map-matched probe data; and update map data with the map-matched probe data, wherein the map data is used for at least one of route guidance or at least semi-autonomous control of vehicles traveling within the road network.

9. The computer program product of claim 8, wherein the program code instructions to map-match the plurality of probe data points to one or more road segments of the road network comprise program code instructions to map-match each of the plurality of probe data points to a candidate road segment using a Hidden Markov Model.

10. The computer program product of claim 8, wherein the closest candidate road segment for the one or more probe data points of the plurality of probe data points is determined based on a distance of the one or more probe data points to the closest candidate road segment.

11. The computer program product of claim 8, wherein the closest candidate road segment for the one or more probe data points of the plurality of probe data points is determined based on a distance of the one or more probe data points to the closest candidate road segment and a heading of the one or more probe data points relative to a heading of the closest candidate road segment.

12. The computer program product of claim 8, wherein the map data of the road network is stored in a map database, wherein the indication of changes to the road network comprising the addition of new road segments and the removal of closed road segments comprises an update to the map data of the road network.

13. The computer program product of claim 12, wherein the update to the map data of the road network comprises link identifiers of closed road segments and new link identifiers for new road segments.

14. The computer program product of claim 13, wherein the program code instructions to map-match the plurality of probe data points to one or more road segments of the road network based on the closest candidate road segments to form map-matched probe data comprise program code instructions to map-match one or more probe data points to a new link identifier of a new road segment.

15. A method comprising:

receiving a plurality of probe data points, the plurality of probe data points are received from probe apparatuses traveling within a road network;

receiving an indication of changes to the road network, wherein the indication of changes comprises an addition of new road segments and a removal of closed road segments;

map-matching the plurality of probe data points to one or more road segments of the road network based on closest candidate road segments to form map-matched probe data;

in response to determining a closest candidate road segment for one or more probe data points of the plurality of probe data points corresponds to a closed road segment, map-matching the one or more probe data points to a next closest candidate road segment determined in the map-matched probe data; and updating map data with the map-matched probe data, wherein the map data is used for at least one of route guidance or at least semi-autonomous control of vehicles traveling within the road network.

16. The method of claim 15, wherein the map-matching the plurality of probe data points to one or more road segments of the road network comprises map-matching each of the plurality of probe data points to a candidate road segment using a Hidden Markov Model.

17. The method of claim 15, wherein the closest candidate road segment for the one or more probe data points of the plurality of probe data points is determined based on a distance of the one or more probe data points to the closest candidate road segment.

18. The method of claim 15, wherein the closest candidate road segment for the one or more probe data points of the plurality of probe data points is determined based on a distance of the one or more probe data points to the closest candidate road segment and a heading of the one or more probe data points relative to a heading of the closest candidate road segment.

19. The method of claim 15, wherein the map data of the road network is stored in a map database, wherein the indication of changes to the road network comprising the addition of new road segments and the removal of closed road segments comprises an update to the map data of the road network.

20. The method of claim 19, wherein the update to the map data of the road network comprises link identifiers of closed road segments and new link identifiers for new road segments.

* * * * *